(12) United States Patent
Barouch et al.

(10) Patent No.: US 11,093,638 B2
(45) Date of Patent: Aug. 17, 2021

(54) DISTRIBUTED MANAGEMENT OF USER PRIVACY INFORMATION

(71) Applicant: Online Media Holdings Ltd, Surry Hills (AU)

(72) Inventors: Jonathan Barouch, Surry Hills (AU); Peter Williams, Belmont, CA (US)

(73) Assignee: ONLINE MEDIA HOLDINGS LTD, Surry Hills (AU)

( * ) Notice: Subject to any disclaimer, the term of this patent is extended or adjusted under 35 U.S.C. 154(b) by 130 days.

(21) Appl. No.: 16/399,318

(22) Filed: Apr. 30, 2019

(65) Prior Publication Data

US 2020/0320219 A1 Oct. 8, 2020

Related U.S. Application Data

(63) Continuation-in-part of application No. 16/376,313, filed on Apr. 5, 2019.

(51) Int. Cl.
| | | |
|---|---|---|
| *G06F 21/00* | (2013.01) | |
| *G06F 21/62* | (2013.01) | |
| *G06F 21/60* | (2013.01) | |
| *H04L 9/14* | (2006.01) | |
| *H04L 9/32* | (2006.01) | |
| *H04L 9/08* | (2006.01) | |

(52) U.S. Cl.
CPC ........ *G06F 21/6245* (2013.01); *G06F 21/602* (2013.01); *H04L 9/0894* (2013.01); *H04L 9/14* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 8,561,127 B1 | 10/2013 | Agrawal et al. | |
| 8,572,697 B2 | 10/2013 | Hayes et al. | |
| 9,219,736 B1* | 12/2015 | Lewis | H04L 67/16 |
| 9,590,950 B2 | 3/2017 | Hallett et al. | |
| 9,665,638 B2 | 5/2017 | Eigner et al. | |

(Continued)

FOREIGN PATENT DOCUMENTS

| | | |
|---|---|---|
| KR | 10-1040519 | 6/2011 |
| KR | 10-2017-0091951 | 8/2017 |

OTHER PUBLICATIONS

International Search Report and Written Opinion dated Jul. 21, 2020 issued for International PCT Application No. PCT/IB2020/053179.

(Continued)

*Primary Examiner* — Andrew J Steinle
(74) *Attorney, Agent, or Firm* — K&L Gates LLP

(57) ABSTRACT

Methods and systems for managing user privacy information in a distributed fashion are provided. In one embodiment, a method is provided that may include receiving an identity with device information that is less sensitive and user information that is more sensitive. The user information may then be encrypted and stored on a repository, and indications of the encrypted device information and the encrypted user information may be stored on a distributed ledger. The method may further include enforcing a first access policy on the encrypted device information and a second access policy on encrypted user information.

20 Claims, 4 Drawing Sheets

(56) References Cited

U.S. PATENT DOCUMENTS

| | | | |
|---|---|---|---|
| 10,231,100 B2 | 3/2019 | Ross et al. | |
| 10,237,256 B1 | 3/2019 | Pena et al. | |
| 10,282,753 B2 | 5/2019 | Cheung | |
| 10,311,250 B2 | 6/2019 | Khi et al. | |
| 10,380,568 B1* | 8/2019 | Rogers | G06Q 20/1235 |
| 10,419,219 B1* | 9/2019 | Wieker | H04W 12/00503 |
| 10,535,062 B1* | 1/2020 | Rule | G07F 7/0893 |
| 2002/0130180 A1* | 9/2002 | Stobbe | G07C 9/00896 |
| | | | 235/451 |
| 2009/0182873 A1 | 7/2009 | Spalink et al. | |
| 2010/0262703 A1 | 10/2010 | Faynberg et al. | |
| 2013/0144721 A1 | 6/2013 | Noh et al. | |
| 2013/0346357 A1 | 12/2013 | Motahari et al. | |
| 2014/0025786 A1 | 1/2014 | Gage | |
| 2014/0129831 A1* | 5/2014 | Odinak | H04L 9/0861 |
| | | | 713/165 |
| 2015/0032821 A1 | 1/2015 | Chen et al. | |
| 2015/0066669 A1 | 3/2015 | Francis et al. | |
| 2015/0113126 A1 | 4/2015 | Fluehr et al. | |
| 2015/0371258 A1* | 12/2015 | Bramucci | G06Q 30/0246 |
| | | | 705/14.45 |
| 2017/0223015 A1 | 8/2017 | Lee et al. | |
| 2018/0025140 A1 | 1/2018 | Edelman et al. | |
| 2018/0249330 A1 | 8/2018 | Zhang et al. | |
| 2018/0331836 A1 | 11/2018 | Burbank et al. | |

OTHER PUBLICATIONS

International Search Report and Written Opinion dated Jul. 20, 2020 issued for International PCT Application No. PCT/IB2020/053334.

\* cited by examiner

DISTRIBUTED MANAGEMENT OF USER PRIVACY INFORMATION

CROSS REFERENCE TO RELATED APPLICATIONS

The present application is a Continuation-in-Part application of U.S. patent application Ser. No. 16/376,313 filed on Apr. 5, 2019, the disclosure of which is incorporated herein by reference for all purposes.

BACKGROUND

It is important for most companies, especially companies in the service industry, to have accurate data on their customers and their customers' experiences with the company. Accurate data on customers can help a company better target marketing and sales efforts. Similarly, data describing customers' experiences and sentiments can help companies recognize both what customers like and dislike about the company's products and/or service offerings and to tailor customer experience to those preferences. However, such information may include sensitive and/or personal details regarding customers, which may require extra precautions to properly store and protect.

SUMMARY

The present disclosure presents new and innovative systems and methods for managing user privacy information. In a first example, a method is provided comprising receiving an identity that comprises device information regarding a user device and user information regarding a user of the user device, encrypting the device information to create encrypted device information, and encrypting the user information to create encrypted user information. The method may further comprise storing the encrypted device information and the encrypted user information in a repository, storing indications of the encrypted device information and the encrypted user information on a distributed ledger, and enforcing a first access policy on the encrypted device information and a second access policy on the encrypted user information.

In a second example according to the first example, storing indications of the encrypted device information and the encrypted user information on the distributed ledger comprises storing the first and second encryption keys on the distributed ledger.

In a third example according to the first and/or second example, storing the encrypted device information and the encrypted user information in the repository comprises storing the encrypted device information and the encrypted user information in separate containers of the repository.

In a fourth example according to the third example, the separate containers of the repository are separate segmented memories of the repository.

In a fifth example according to any of the previous examples, the identity further includes a unique identifier and both the encrypted device information and the encrypted user information are stored in association with the unique identifier.

In a sixth example according to the fifth example, the unique identifier is encrypted with the device information and the user information to form the encrypted device information and the encrypted user information.

In a seventh example according to the fifth example, the encrypted device information and the encrypted user information are stored with associations to the unique identifier.

In an eighth example according to the fifth example, the unique identifier is hashed before storing to generate a hashed unique identifier that is stored in association with the encrypted device information and the encrypted user information.

In a ninth example according to any of the previous examples, the method further comprises storing the first and second encryption keys via a privacy manager configured to enforce the first and second access policies.

In a tenth example according to any of the previous examples, the first access policy includes a first time stamp and the second access policy includes a second time stamp that is earlier than the first time stamp.

In an eleventh example according to the tenth example, the privacy manager is configured to delete the encrypted device information after the first time stamp and to delete the encrypted user information after the second time stamp.

In a twelfth example according to any of the previous examples, the method further comprises receiving, at the privacy manager, a request to access the user information from a requesting party, determining that the requesting party is authorized under the second access policy, and allowing the requesting party to access the data.

In a thirteenth example according to the twelfth example, allowing the requesting party to access the data comprises providing the requesting party with the encryption key.

In a fourteenth example according to the twelfth example, allowing the requesting party to access the data comprises decrypting the encrypted user information with the second encryption key and providing the user information to the requesting party.

In a fifteenth example according to the twelfth example, providing the user information to the requesting party comprises providing indirect access to the user information.

In a sixteenth example according to any of the previous examples, the method further comprises receiving a request from the user to revoke access for a removed party to one or both of the user information and the device information and removing the removed party from the associated access policy.

In a seventeenth example according to any of the previous examples, the method further comprises receiving a request from the user to remove all access to one or both of the device information and the user information and removing the associated encryption key.

In an eighteenth example according to any of the previous examples, the first access policy includes no user-based access restrictions.

In a nineteenth example according to any of the previous examples, the second access policy allows only authorized accessors to access the user information.

In a twentieth example according to the nineteenth example, at least one of the authorized accessors is granted permission by the user.

In a twenty-first example according to the twentieth example, the user grants at least one authorized accessor access for a limited time.

In a twenty-second example according to any of the previous examples, the second access policy restricts access to the user information based on country location of one or both of the user and a requesting party seeking access to the user information.

In a twenty-third example according to any of the previous examples, the identity is a full identity that is sufficient to personally identify the user.

In a twenty-fourth example according to any of the previous examples, the identity is a partial identity that is insufficient to personally identify the user.

In a twenty-fifth example, a system is provided comprising a processor and a memory. The memory stores instructions which, when executed by the processor, cause the processor to receive an identity that comprises device information regarding a user device and user information regarding a user of the user device, separate the device information and the user information, and encrypt the device information with a first encryption key to create encrypted device information. The memory may store further instructions which, when executed by the processor, cause the processor to encrypt the user information with a second encryption key to create encrypted user information, store indications of the encrypted device information and the encrypted user information on the distributed ledger, and enforce a first access policy on the device information and a second access policy on the user information.

In a twenty-sixth example, a non-transitory, computer-readable medium is provided storing instructions which, when executed by a processor, cause the processor to receive an identity that comprises device information regarding a user device and user information regarding a user of the user device, separate the device information and the user information, and encrypt the device information with a first encryption key to create encrypted device information. The non-transitory, computer-readable medium may store further instructions which, when executed by the processor, cause the processor to encrypt the user information with a second encryption key to create encrypted user information, store indications of the encrypted device information and the encrypted user information on the distributed ledger, and enforce a first access policy on the device information and a second access policy on the user information.

In a twenty-seventh example, a method is comprising receiving an identity that comprises device information regarding a user device and user information regarding a user of the user device, generating a unique identifier corresponding to the identity, and encrypting the device information with a first encryption key to create encrypted device information. The method may further comprise encrypting the user information with a second encryption key to create encrypted user information, storing a first hash of the encrypted device information on a distributed ledger in association with the unique identifier, and storing a second hash of the encrypted user information on the distributed ledger in association with the unique identifier. The method may still further comprise receiving a data access request including the unique identifier and one or both of the first hash and the second hash, enforcing a first access policy on the data access request if the data access request includes the first hash, and enforcing a second access policy on the data access request if the data access request includes the second hash. The first and second access policies may be stored in association with the unique identifier.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

One way to address the above-identified problems is to provide a system capable of separating sensitive user privacy information from less-sensitive user privacy information in order to enforce differing access policies according to the information sensitivity. However, in order to maximize the value of collected information, such systems should also be able to allow analytics and other review of collected information in compliance with the pertinent access policies. For example, access may be permitted to perform system analytics or to provide service recommendations based on determined user preferences. In addition to the above, the system may also process requests from a user to change access policies to certain pieces of information and to enforce such changes on future requests to access the information.

Figure 1:
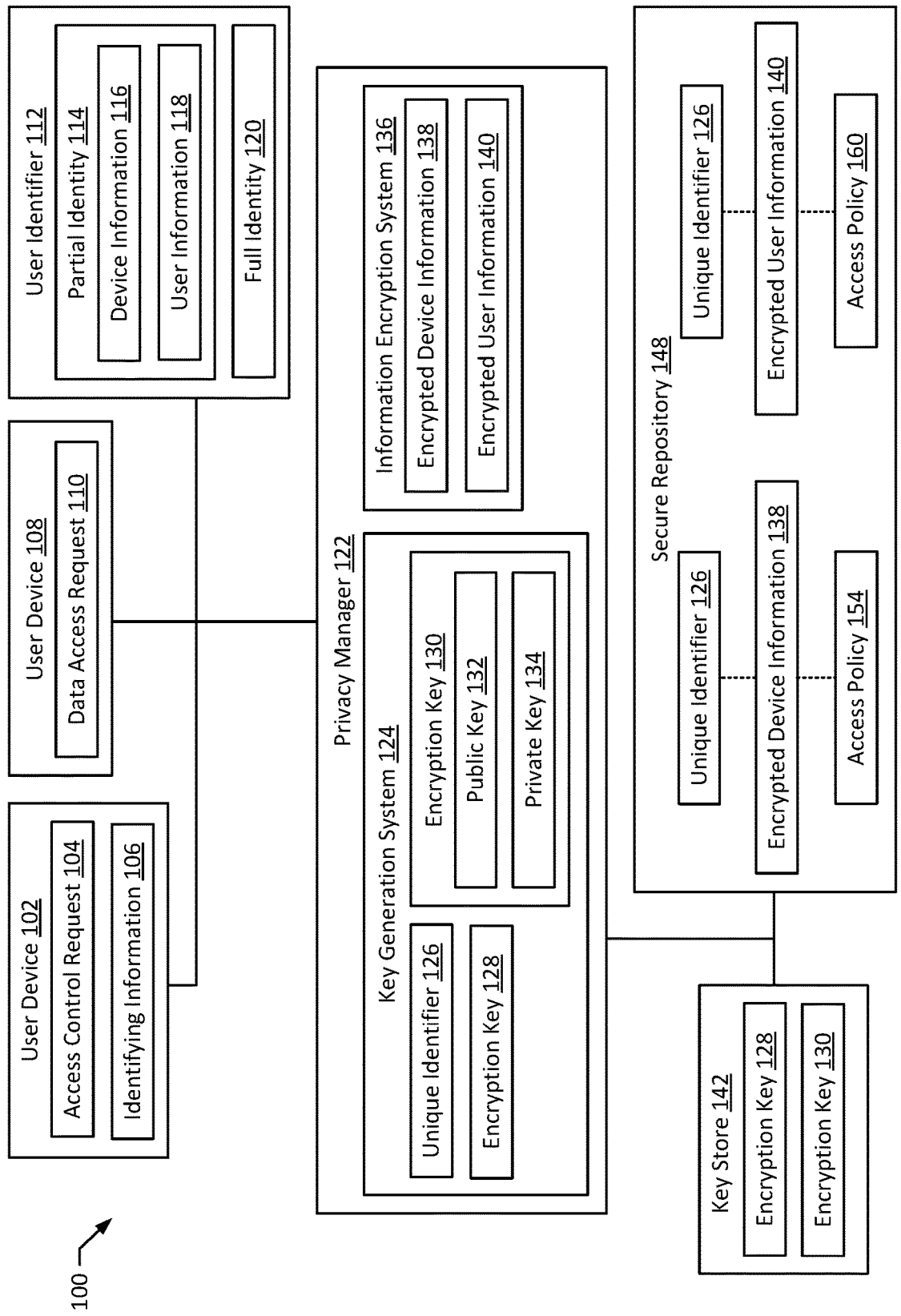
FIG. 1 illustrates a system according to an exemplary embodiment of the present disclosure.

FIG. 1 depicts a system 100 according to an exemplary embodiment of the present disclosure. The system 100 may be configured to receive and securely process and manage user privacy information. The system 100 includes user devices 102, 108, a user identifier 112, a privacy manager 122, a key store 142, and a secure repository 148. One of more of the user identifier 112, the privacy manager 122, the key store 142, and the secure repository 148 may be implemented by one or more CPUs and memories. For example, the memories may store one or more instructions which, when executed by the CPUs, cause the CPUs to implement one or more functions of the user identifier 112, the privacy manager 122, the key store 142, and the secure repository 148. The above-mentioned components of the system 100 may communicate along the links depicted in FIG. 1. These communicative links may be implemented as a network connection, such as a local network connection or a network connection via the Internet or similar external network. These communications may take place along one or more wired or wireless network interfaces (e.g., ETHERNET, WI-FI, BLUETOOTH, and cellular interface connections).

The user devices 102, 108 may be used by users (e.g., customers or other individuals of interest). For example, the user device 102 may be used by a user to connect to a wireless network provided by a business. While the user device 102 interacts with the network, the user device 102 may exchange identifying information 106 of the user device (e.g., a MAC address, a serial number, an IMEI identifier, and/or an IP address). The user devices 102, 108 may also generate access control requests 104 for manipulating access policies 154, 160 and/or data access requests 110 for accessing data stored on the secure repository 148, as discussed below. The user devices 102, 108 may be implemented by computing devices such as smartphones, personal computers, tablet computers.

The user identifier 112 may be configured to generate identities corresponding to user devices 102, 108. For example, the user identifier 112 may generate a partial identity 114 reflecting at least a partial identification of a user associated with the user device 102, 108 and/or a full identity 120 representing a complete identification of the user associated with the user device 102, 108. In generating the identities 114, 120, the user identifier 112 may receive and process the identifying information 106 from the user devices 102, 108. For example, where the user device 102 is connected to a wireless network provided by a business, the user identifier 112 may receive the identifying information 106 and may monitor network traffic associated with the user identifier 112 to generate the partial identity 114 and the full identity. The partial identity 114 is depicted as including device information 116, such as identifying information regarding the user device 102, and user information 118, such as preferences or other identifying information of the user associated with the user device 102. Although not depicted, the full identity 120 may include similar information. Additional information regarding generation of the partial identity 114 and the full identity 120 is provided in U.S. application Ser. No. 16/376,313, entitled "Network-Based Partial and Full User Identification Techniques," which is hereby incorporated by reference.

The privacy manager 122 may be configured to receive and process information reflected in the identities 114, 120 (e.g., device information 116 and user information 118) to protect user privacy. For example, because it concerns individuals, the user information 118 may implicate greater privacy concerns due to higher user privacy expectations and/or statutory privacy requirements (e.g., under the Health Insurance Portability and Accountability Act, the EU General Data Protection Regulation, and the California Consumer Privacy Act). By contrast, the device information 116 may concern less-sensitive information and may therefore be subject to more relaxed access concerns. Based on these discrepancies, the privacy manager 122 may allow easier access (e.g., for analytics and research) to device information 116 than to the user information 118.

The privacy manager 122 includes a key generation system 124 that may be configured to generate encryption keys 128, 130 for encryption of the device information 116 and the user information 118. The key generation 124 may generate one or more encryption keys 128, 130 based on a unique identifier 126 of a user (e.g., the user associated with the user device 102, 108). In certain implementations, the unique identifier 126 may be a unique identifier of the user device 102, such as a MAC address of the user device 102 from which a corresponding identity 114, 120 is generated. In still further embodiments, the unique identifier 126 may be received with the identity 114, 120. The key generation system 124 may generate one or more encryption keys 128, 130 for each received identity 114, 120. For example, the key generation system 124 may generate a single encryption key 130 for encrypting both the device information 116 and the user information 118. In another example, the key generation system 124 may generate a first encryption key 128 for encrypting the device information 116 and a second encryption key 130 for encrypting the user information 118. One or both of the encryption keys 128, 130 may include a private key 134 and a public key 132, as depicted for the encryption key 130.

The information encryption system 136 may be configured to encrypt the device information 116 and the user information 118 to generate encrypted device information 138 and encrypted user information 140, respectively. For example, the information encryption system 136 may encrypt the device information 116 and the user information 118 using the one or more encryption keys 128, 130.

The privacy manager 122 may then store the encrypted device information 138 and the encrypted user information 140 in the secure repository 148. For example, as depicted, the secure repository 148 may store the encrypted device information 138 in association with the unique identifier 126 and an access policy 154 and may store the encrypted user information 140 in association with the unique identifier 126 and a different access policy 154. In certain implementations, the encrypted device information 138 and the encrypted user information 140 may be stored separately in the secure repository 148 (e.g., in different containers or on different storage media of the secure repository 148).

The privacy manager 122 may also store the encryption keys 128, 130 in the key store 142. The key store 142 may store both public keys 132 and private keys 134 in certain implementations. In other implementations, the key store 142 may store public keys and the secure repository 148 may store private keys 134. In still further implementations, all or part of the encryption keys 128, 130 may be encrypted before storage within the key store 142. For example, the private key 134 may be encrypted prior to storage within the key store 142 (e.g., using a private key of the privacy manager 122).

Figure 2:
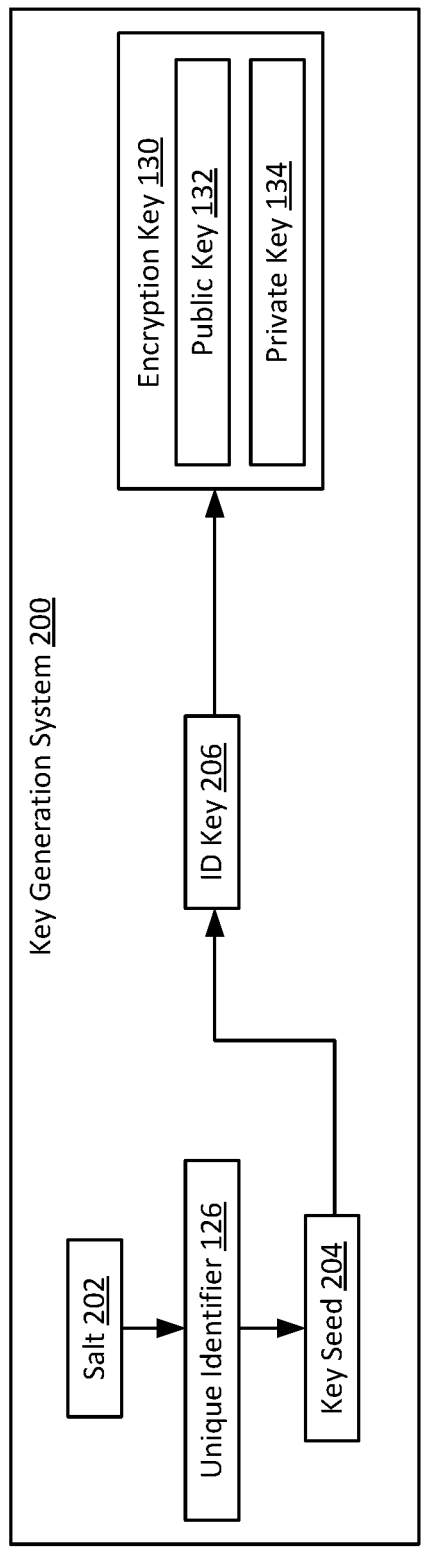
FIG. 2 illustrates a key generation system according to an exemplary embodiment of the present disclosure.

FIG. 2 depicts a key generation system 200 according to an exemplary embodiment of the present disclosure. The key generation system 200 may be an exemplary implementation of the key generation system 124 and may depict a key generation operation. In particular, the key generation system 200 as depicted may perform a key generation operation using the unique identifier 126 to generate the encryption key 130.

In particular, as depicted, the key generation system 200 may hash the unique identifier 126 with salt 202 (e.g., random data) to generate the key seed 204. The key seed 204 may then be used to generate an ID key 206. The ID key 206 may, in certain implementations be used by the privacy manager 122 in a temporal manner. For example, where a user device 102 interacts with the user identifier 112 multiple times over a given duration, the ID key 206 may be used to link these interactions across the different interactions if it is generated from the unique identifier 126 associated with the user device 102.

The key generation system 200 may then generate one or more encryptions keys 130 based on the ID key 206. In certain implementations, a Merkle tree structure, such as a Merkle signature scheme, may be used for each block of data from the user information 118 and the device information 116 that is encrypted. Such implementations may create a stateful, hash-based encryption for the encrypted device information 138 and the encrypted user information 140. In such arrangements, the public key 132 may be a value of or may be bound to the root node of the Merkle tree structure and the private key 138 may be an aggregation of each of the one-time signatures used in the interior branches of the Merkle tree structure. The privacy manager 122 may manage the Merkle tree structure and one or more one-time signatures thereof. The public key 134 for these encrypted information sets may then be made available to requesting entities as appropriate, such as those undertaking evaluation, analytics, aggregation or other processing of these information sets. For example, this can include system operations, host customer resource management (CRM) services, machine learning operations, pattern and matching operations, and analytics.

Figure 3:
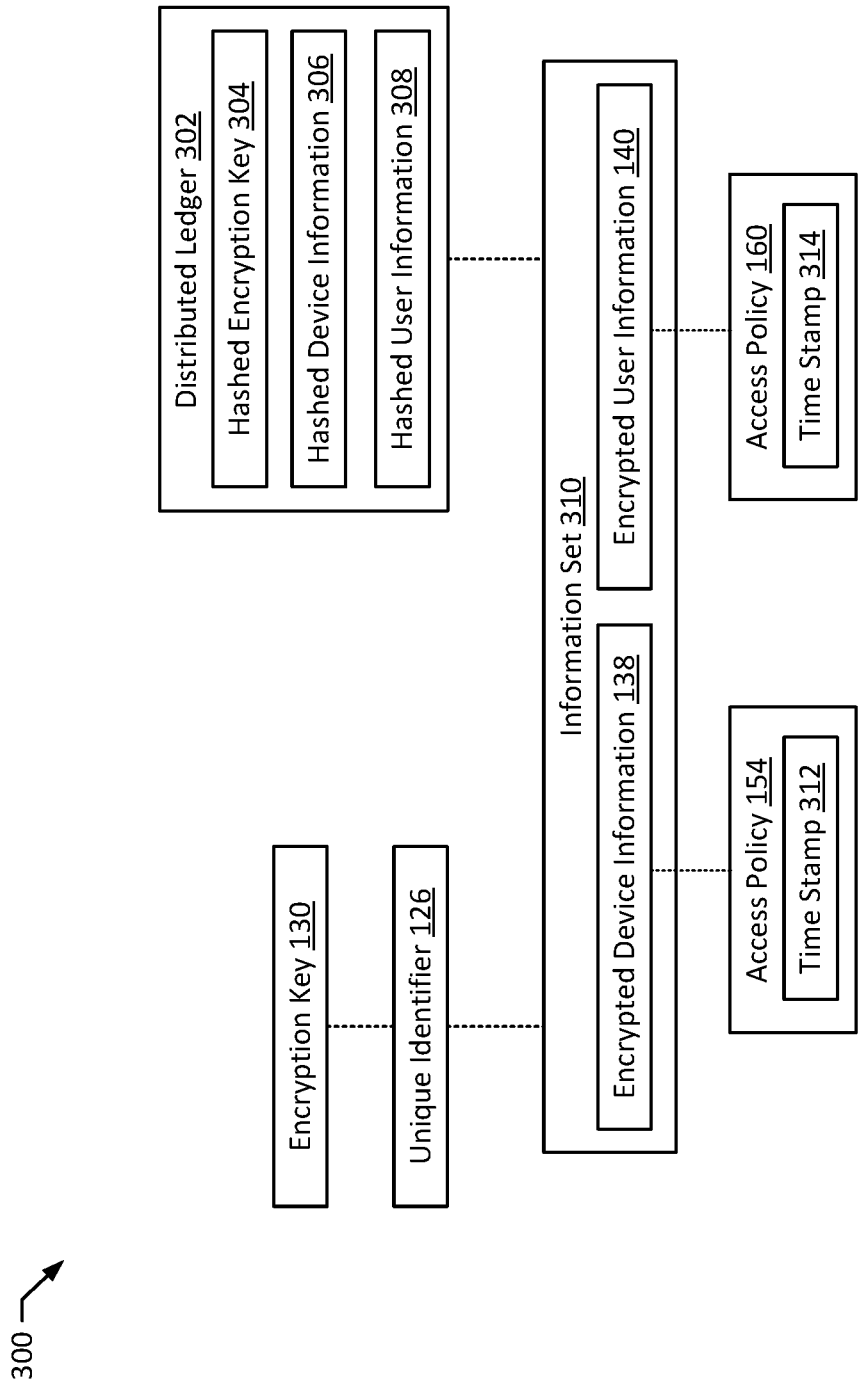
FIG. 3 illustrates a data schema according to an exemplary embodiment of the present disclosure.

FIG. 3 depicts a data schema 300 according to an exemplary embodiment of the present disclosure. The data schema 300 may depict one exemplary form of storing user privacy information in an encrypted fashion such that one or more parties may be granted access according to an access policy 154, 160. For example, the data schema 300 may be implemented by the system 100 (e.g., by the privacy manager 122, key store 142, and/or secure repository 148) to store and control access to encrypted device information 138, 140 in a decentralized fashion.

Accordingly, the data schema 300 further includes a distributed ledger 302, which may store indications of the data stored in the secure repository 148. The distributed ledger 302 may be implemented using one or more public or private implementations. In particular, the distributed ledger 302 may be implemented by one or more nodes (e.g., computing devices) implementing a blockchain. The implementing nodes may be all or partly controlled by an entity implementing the system. For example, the distributed ledger 302 may be implemented as a private blockchain. In other implementations, the distributed ledger 302 may be implemented as a public blockchain (e.g., the Ethereum® or Bitcoin® blockchains).

In the data schema 300, the encryption 130 is stored in association with the unique identifier 126. For example, the encryption key 130 may be stored in the key store 142 alongside an indicator referring to the unique identifier 126 (e.g., the unique identifier 126 itself and/or a hash of the unique identifier 126). In certain implementations, the public key 132 and the private key 134 may be stored separately. For example, the public key 132 may be stored in a publicly-available key store 142, while the private key 134 may be stored in the secure repository 148.

The data schema 300 also includes an information set 310, which includes the encrypted device information 138 and the encrypted user information 140. The information set 310 may be stored in the secure repository 148. The information set 310 may be stored associated with the unique identifier 126. Similar to the encryption key 130, the information set 310 may be stored alongside an indicator referring to the unique identifier 126 (e.g., the unique identifier 126 itself and/or a hash of the unique identifier 126). In certain implementations, as discussed above, the encrypted device information 138 and the encrypted user information 140 may be stored in separate containers of the secure repository 148. In such implementations, each of the encrypted device information 138 and the encrypted user information 140 may separately store an association with the unique identifier 126.

The encrypted device information 138 has a first associated access policy 154, while the encrypted user information 140 has a second associated access policy 160. These associations may be stored with the access policies 154, 160 as an identifier of the corresponding encrypted information 138, 140 and/or with the encrypted information 138, 140 as an identifier of the corresponding access policy 154, 160. Each of the encrypted device information 138 and the encrypted user information 140 may require its own access policy 154, 160 because of the varying sensitivity of the corresponding information. For example, the user may only desire for the user information 118 to be accessible by third parties for a shorter period of time (e.g., only while the user is on the premises of the entity offering the wireless network), while it may be permissible for the device information 116 to be accessible for longer periods (e.g., for weeks or months to enable analytics). Accordingly, each access policy 154, 160 may have its own associated time stamp 312, 314, indicating a time after which the associated encrypted information will no longer be accessible, or no longer accessible for certain requesting parties. In the above example, the time stamp 312 may be later in time than the time stamp 314, because a longer duration of accessibility of the device information 116 may be acceptable.

The distributed ledger 302 may store information regarding the data stored in the secure repository 148. For example, as the privacy manager 122 receives and stores new device information 116 and user information 118, the privacy manager 122 may store indications of the stored information 116, 118 on the distributed ledger 302. Interested parties may then submit data access requests 110 to access the stored data according to the associated access policies 154, 160. In certain implementations, after storing the encryption key 130, the encrypted device information 138, and the encrypted user information 140, the privacy manager 122 may hash one or more of the stored items to generate, e.g., a hashed encryption key 304, hashed device information 306, and/or hashed user information 308. The hashed indications may then be stored on the distributed ledger 302 and available to other parties. For example, the privacy manager 122 may generate the hashes using a one-time signature (e.g., a Lamport signature). For instance, after identifying an indication such as the hashed encryption key 304, a user device 108 may generate a data access request 110 (e.g., at a user's request) requesting access to the associated information set 310 within the secure repository 148. The data access request 110 may include the hashed encryption key 304, which the privacy manager 122 may use to identify the corresponding encryption key 130 (e.g., by comparing hashes of the stored encryption keys 128, 130). After identifying the encryption key 130, the privacy manager 122 can traverse the data schema 300 to identify the corresponding unique identifier 126 and information set 310. In this way, the data schema 300 may enable limited data to be publicly available on the distributed ledger 302, while still allowing for interested parties to request access to specific information sets, or parts thereof, within the secure repository 148. In particular, such implementations may allow a subsequent requesting party view the information in the distributed ledger and authenticate the validity of that information without access to the underlying data. In this manner a requester may validate whether certain events occurred, such as one or a number of devices and their users where present at a specific location.

Figure 4:
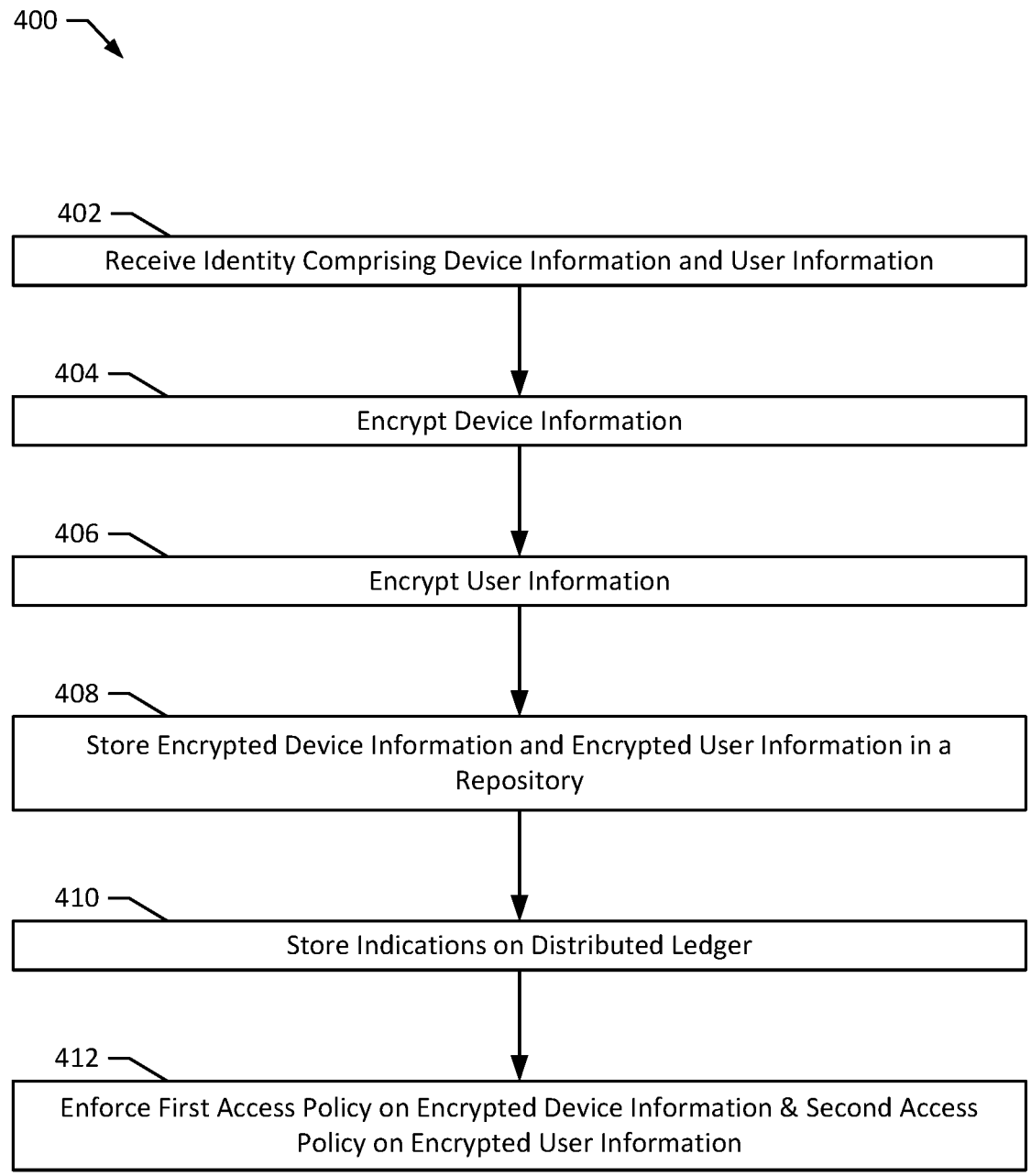
FIG. 4 illustrates a method according to an exemplary embodiment of the present disclosure.

FIG. 4 depicts a method 400 according to an exemplary embodiment of the present disclosure. The method 400 may be performed to receive and manage user privacy information in a distributed manner. In particular, the method 400 may be performed by the system 100 to receive and process device information 116 and user information 118 from identities 114, 120. The method 400 may be implemented on a computer system, such as the system 100. For example, the method 400 may be implemented by the privacy manager 122, the secure repository 148, the key store 142, and the distributed ledger 302. The method 400 may also be implemented by a set of instructions stored on a computer readable medium that, when executed by a processor, cause the computer system to perform the method. For example, all or part of the method 400 may be implemented by one or more CPUs and memories configured to implement the functions of the privacy manager 122, the secure repository 148, and the key store 142. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with the privacy manager 122 receiving an identity 114, 120 comprising device information 116 and user information 118 (block 402). For example, the privacy manager 122 may receive the identity 114, 120 from the user identifier 112 after the user identifier 112 creates or updates the identity 114, 120.

The privacy manager 122 may then encrypt the device information 116 to create encrypted device information 138 (block 404) and may encrypt the user information 118 to create encrypted user information 140 (block 406). In particular, the privacy manager 122 may encrypt the device information 116 and the user information 118 using one or more encryption keys 128, 130 generated by the key generation system 124. In certain implementations, the device information 116 may be encrypted using a first encryption key 128 while the user information 118 may be encrypted using a second encryption key 130.

The privacy manager 122 may then store the encrypted device information 138 and the encrypted user information 140 in a repository (e.g., the secure repository 148) (block 408). For example, the privacy manager 122 may store the encrypted device information 138 and the encrypted user information 140 in the secure repository 138 as an information set 310 according to the data schema 300. In particular, the privacy manager 122 may store associated access policies 154, 160 in the secure repository 148 along with the encrypted device information 138 and the encrypted user information 140. In still further implementations, one or both of the encrypted device information 138 and the encrypted user information 140 may be stored associated with a unique identifier 126 (e.g., an identifier associated with the user device 102 corresponding to the received identity 114, 120). After encrypting the device information 116 and the user information 118, the privacy manager 122 may store all or part of the used encryption key 128, 130 in the key store 142, as discussed above.

The privacy manager 122 may then store indications of the stored encrypted device information 138 and encrypted user information 140 on a distributed ledger 302 (block 410). For example, and as explained further above, the privacy manager 122 may hash one or more of the encryption key 128, 130, the encrypted device information 138, and the encrypted user information 140 to generate a hashed encryption key 304, hashed device information 306, and/or hashed user information 308. One or more of these indications 304, 306, 308 may then be uploaded to the distributed ledger 302 for storage. Once uploaded to the distributed ledger 302, the indications 304, 306, 308 may be visible to one or more other users or computer processes (e.g., processes controlled by an entity that created the identity 114, 120).

In certain implementations, the encrypted device information 138 and/or the encrypted user information 140 may include one or more timestamped data entries forming a series of events and may have a one time signature applied to the data entries. For example, if a user interacts with an entities network upon awakening at a location associated with the entity (e.g., a hotel), until departing that hotel for the day. The data entries associated with that time period may be encrypted and added to the encrypted device information 138 and/or the encrypted user information 140 within the Merkle tree. Upon returning to the hotel in the evening, the user may initiate a further session by interacting with the network and associated information may be added to the encrypted device information 138 and the encrypted user information 140. As the information sets are augmented over time and the one time signatures comprising the Merkle tree, each may be treated separately and may have unique keys assigned to them such that access control according to the access policies 154, 160 can be employed on a per-entry basis.

In a similar manner a session associated with at least one user may be parsed by a process to determine a specific topic or event set that is part of a user's session interacting with the entity's network. Data entries may then be extracted from the session and may be encrypted and stored using encryption keys 128, 130 according to a separate branch of the Merkle tree or other hash tree arrangement and as such may have encryption keys 128, 130 bound to the tree.

The privacy manager 122 may then enforce a first access policy 154 on the encrypted device information 138 and a second access policy 160 on the encrypted user information 140 (block 412). For example, the privacy manager 122 may receive a data access request 110 from a user device 108 associated with the other users or processes. The data access request 110 may request access to one or both of the encrypted device information 138 and the encrypted user information 140 by including the indication 304, 306, 308 in the data access request 110. If the data access request 110 requests access to the encrypted device information 138, the privacy manager 122 may enforce the first access policy 154 based on a time stamp 312 associated with the first access policy 154. As explained above, because the privacy concerns associated with the device information 116 may be diminished, the first access policy 154 and related time stamp 312 may be less strict than the second access policy 160 (e.g., the time stamp 312 may be later than the time stamp 314). If the data access request 110 is received after the time stamp 312 specified in the first access policy 154, the privacy manager 122 may block the request and prevent access. If the data access request 110 additionally or alternatively requests access to the encrypted user information 140, the privacy manager 122 may additionally or alternatively enforce the second access policy 160 on the data access request 110. For example, if the data access request 110 is received after the time stamp 314 associated with the second access policy 160, the privacy manager 122 may block the request. In implementations where the data access request 110 request access to both the encrypted device information 138 and the encrypted user information 140, the privacy manager may enforce both the first and second access policies 154, 160. For example, if such a data access request 110 is received after the time stamp 314 of the second access policy 160 but before the time stamp 312 of the first access policy 154, the privacy manager 122 may grant access to the encrypted device information 138 and block access to the encrypted user information 140. In granting access, the privacy manager 122 may provide access to the public key 132 used to encrypt the granted encrypted information 138, 140. In other embodiments, the key generation system 124 may create and manage a separate encryption key for the purpose of providing access to the encrypted information 138, 140 for a specified period of time and/or by a specified entity.

In certain implementations, as described above, the encrypted device information 138 and the encrypted user information 140 may be generated in a segmented manner using a Merkle hash tree, which may be based on criteria such as time, data volume, topic, or other specified conditions.

To block access to a request, (e.g., according to an access policy or access control request in compliance with a regulatory requirement) the privacy manager 122 may discard the private key 134 used to generate the encrypted device information 138 and/or encrypted user information 140. When the private key 134 is deleted, it will not be possible to decrypt and access the device information 116 and/or user information 118, completely preventing future access to the data. That said, the existence of the information 116, 118 may still be verifiable through the immutable record of the distributed ledger 302.

To prevent access to the information 116, 118 after download, the privacy manager 122 may employ DRM techniques (e.g., Marlin DRM or Widevine DRM) and/or may use other access control and rights management techniques. This can include rights management solutions that are based on rulesets, which are managed by privacy manager 122. The enforcement of such rules can be managed by the privacy manager 122 or other components of the system, e.g., user devices 102, 108, the user identifier 112, the secure repository 148, and/or the key store 142.

Once a data access request is approved, the encryption keys 128, 130 may be delivered throughout the system 129, 130 using secure communication channels, such as a secure messaging system. For example, the encryption keys 128, 130 to an approved, validated, or authenticated requester or deleting, in a securer and validated manner, the keys from the repositories operated by the system. In certain implementations, the analytics undertaken by the system, however, may be retained though without any direct or traceable artifact of the original identity of the requester whose events and interactions have been analyzed.

In this way, the system 100 may account for the separate privacy needs of both sensitive user information 118 and less-sensitive device information 116. In addition, because indication 304, 306, 308 of the received and processed user privacy information are stored on a distributed ledger 302, users and other system processes can take advantage of the stored information without running afoul of the access policies 154, 160 or related regulations.

In addition to the above-described functionalities, the privacy manager 122 may also receive and process access control requests 104 from user devices 102 associated with the identities 114, 120 to adjust or edit access policies 154, 160. For example, the privacy manager 122 may be configured to accept access control requests 104 from parties to remove, restrict, or add access to the encrypted device information 138 and/or encrypted user information 140 associated with the party. For example, the access control request 104 may add authorized accessors, remove authorized accessors, and/or adjust the level of access granted to authorized accessors (e.g., adding or removing all or part of the encrypted device information 138 and the encrypted user information 140) or a duration of granted access associated with one or more authorized accessors. Such requests may require levels of authentication and validation of the requesting user device 102. For example if a user device 102 whose unique identity 126 has been used to generate one or more authentication keys 128, 130, generates a access control request 104 that the device information 116 and/or the user information 118 collected during their use of host systems (e.g., host-provided wireless networking services) over a period of time be deleted or made permanently unavailable. Subsequent to verifying the user device 102 and user and in compliance with the configuration of the privacy manager 122, the corresponding encrypted device information 138 and/or encrypted user information 140 may be made permanently unavailable through deletion of the encryption keys 128, 130 for that user.

For example, in verifying the user, the privacy manager 122 may require that a user ID associated with the user or the access control request 104 is sufficient to match a user ID associated with the encrypted device information 138 and the encrypted user information 140. Upon submitting the access control request, the user may be made aware of retention of information though an opt in notice or another notification regarding retention policies in compliance with regulatory requirements. In certain embodiments, a degree of certainty of identity of the user of a device may in part determine the user's ability to request removal, deletion or obscuring of the encrypted device information 138 and/or the encrypted user information 140. If a user, through a software application, portal, loyalty program membership, or other information transfer has made their identity available to the system, such that their device and interactions with the system can be reliably assigned to that identity, then a request emanating from that validated identity can be serviced by the system to remove or revoke access to any or all of the events of that they have undertaken and that are stored by the system.

The user device 102 may transmit the access control request 104 via a portal associated with the privacy manager 122. For example, the privacy manager 122 may implement a software portal accessible over a network such as the internet. In such implementations, the user's identify may be sufficiently determined (e.g., based on credentials or other identifiers provided by the user to access the portal) to enable and authorize data access requests 104 on behalf of the user. In certain implementations, the user may be prompted with a series of questions to respond to (e.g., to identify a time span and/or location of interaction with the user identifier 112 or related system).

Once the identity of the user has been sufficiently determined, the privacy manager 122 may enable direct or indirect interaction with the secure repository 148 containing the information sets 310 of that user or to modify access policies 154, 160 associated with such information sets 310. This interaction may also or alternatively include deletion or removal of the encrypted information 138, 140 and/or the encryption keys 128, 130 controlling access to the information. The user may be offered various selections, such as complete removal, partial removal or retention of access for one or more authorized accessors or for access requestors generally.

In further embodiments, the distributed ledger 302 may be accessible to a user, for example through a connected repository or directly through a public or accessible interface. If a user who has sufficient information, for example a public key 132 or other indication of encrypted information 138, 140 stored in the secure repository 148, digital token that corresponds to at least one record held in the distributed ledger, the user may add the access control request 104 to the distributed ledger and the privacy manager 122 may monitor the distributed ledger 302 for access control requests 104 for subsequent processing as discussed above.

In certain implementations, the access policies 154, 160 may include one or more authorized accessors. For example, the access policies 154, 160 may include one or more access control lists (ACLs) specifying one or more authorized forbidden accessors. The ACL list may be provided, for example using a rules based approach, or calculated by determining the identities involved in the information transfer or transaction.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
   receiving an identity that comprises device information regarding a user device and user information regarding a user of the user device;
   encrypting the device information to create encrypted device information;
   encrypting the user information to create encrypted user information;
   storing, the encrypted device information and the encrypted user information in a repository;
   storing indications of the encrypted device information and the encrypted user information on a distributed ledger; and
   enforcing, a first access policy including a first time stamp on the encrypted device information and a second access policy including a second time stamp on the encrypted user information;
   deleting the encrypted device information after the first time stamp and the encrypted user information after the second time stamp.

2. The method of claim 1, wherein storing indications of the encrypted device information and the encrypted user information on the distributed ledger comprises storing the first and second encryption keys on the distributed ledger.

3. The method of claim 1, wherein storing the encrypted device information and the encrypted user information in the repository comprises storing the encrypted device information and the encrypted user information in separate containers of the repository.

4. The method of claim 3, wherein the separate containers of the repository are separate segmented memories of the repository.

5. The method of claim 1, wherein the identity further includes a unique identifier and both the encrypted device information and the encrypted user information are stored in association with the unique identifier.

6. The method of claim 5, wherein the unique identifier is encrypted with the device information and the user information to form the encrypted device information and the encrypted user information.

7. The method of claim 5, wherein the encrypted device information and the encrypted user information are stored with associations to the unique identifier.

8. The method of claim 5, wherein the unique identifier is hashed before storing to generate a hashed unique identifier that is stored in association with the encrypted device information and the encrypted user information.

9. The method of claim 1, wherein the second time stamp is earlier than the first time stamp.

10. The method of claim 9, wherein a privacy manager enforces the first and second access policies and deletes the encrypted device information and encrypted user information.

11. The method of claim 1, further comprising:
    receiving, at the privacy manager, a request to access the user information from a requesting party;
    determining that the requesting party is authorized under the second access policy; and
    allowing the requesting party to access the data.

12. The method of claim 11, wherein allowing the requesting party to access the data comprises providing the requesting party with the encryption key.

13. The method of claim 11, wherein allowing the requesting party to access the data comprises:
    decrypting the encrypted user information with the second encryption key; and
    providing the user information to the requesting party.

14. The method of claim 11, wherein providing the user information to the requesting party comprises providing indirect access to the user information.

15. The method of claim 1, further comprising:
    receiving a request from the user to revoke access for a removed party to one or both of the user information and the device information; and
    removing the removed party from the associated access policy.

16. The method of claim 1, further comprising:
    receiving a request from the user to remove all access to one or both of the device information and the user information; and
    removing the associated encryption key.

17. The method of claim 1, wherein the first access policy includes no user-based access restrictions and wherein the second access policy allows only authorized accessors to access the user information.

18. A system comprising:
    a processor; and
    a memory storing instructions which, when executed by the processor, cause the processor to:
        receive an identity that comprises device information regarding a user device and user information regarding a user of the user device;
        separate the device information and the user information;
        encrypt the device information with a first encryption key to create encrypted device information;
        encrypt the user information with a second encryption key to create encrypted user information;
        store indications of the encrypted device information and the encrypted user information on the distributed ledger;
        enforce a first access policy including a first time stamp on the encrypted device information and a second access policy including a second time stamp on the encrypted user information; and
        delete the encrypted device information after the first time stamp and the encrypted user information on the second time stamp.

19. The system of claim 18 wherein the second time stamp is earlier than the first time stamp.

20. A non-transitory, computer-readable medium storing instructions which, when executed by a processor, cause the processor to:
    receive an identity that comprises device information regarding a user device and user information regarding a user of the user device;

separate the device information and the user information;
encrypt the device information with a first encryption key to create encrypted device information;
encrypt the user information with a second encryption key to create encrypted user information;
store indications of the encrypted device information and the encrypted user information on the distributed ledger;
enforce a first access policy including a first time stamp on the encrypted device information and a second access policy including a second time stamp on the encrypted user information; and
delete the encrypted device information after the first time stamp and the encrypted user information on the second time stamp.

* * * * *